United States Patent
Ghosh et al.

(10) Patent No.: US 11,836,447 B2
(45) Date of Patent: Dec. 5, 2023

(54) WORD EMBEDDING FOR NON-MUTUALLY EXCLUSIVE CATEGORICAL DATA

(71) Applicant: KONINKLIJKE PHILIPS N.V., Eindhoven (NL)

(72) Inventors: Erina Ghosh, Boston, MA (US); Stephanie Lanius, Cambridge, MA (US); Emma Holdrich Schwager, Cambridge, MA (US); Larry James Eshelman, Ossining, NY (US)

(73) Assignee: Koninklijke Philips N.V., Eindhoven (NL)

(*) Notice: Subject to any disclaimer, the term of this patent is extended or adjusted under 35 U.S.C. 154(b) by 825 days.

(21) Appl. No.: 16/846,605

(22) Filed: Apr. 13, 2020

(65) Prior Publication Data
US 2020/0342261 A1  Oct. 29, 2020

Related U.S. Application Data

(60) Provisional application No. 62/874,098, filed on Jul. 15, 2019, provisional application No. 62/838,433, filed on Apr. 25, 2019.

(51) Int. Cl.
| | | |
|---|---|---|
| *G06K 9/62* | (2022.01) | |
| *G06N 20/00* | (2019.01) | |
| *G06F 40/216* | (2020.01) | |
| *G06F 18/214* | (2023.01) | |
| *G06F 18/24* | (2023.01) | |

(52) U.S. Cl.
CPC .......... *G06F 40/216* (2020.01); *G06F 18/214* (2023.01); *G06F 18/24765* (2023.01); *G06N 20/00* (2019.01)

(58) Field of Classification Search
CPC ........ G06N 3/084; G06N 20/00; G06F 40/30; G06F 40/242; G06F 40/284; G06F 40/216; G06F 18/214; G06F 18/24765
See application file for complete search history.

(56) References Cited

U.S. PATENT DOCUMENTS

| | | | |
|---|---|---|---|
| 10,509,863 B1* | 12/2019 | Arfa | G06F 18/22 |
| 2018/0082197 A1* | 3/2018 | Aravamudan | G06N 5/022 |
| 2019/0180030 A1* | 6/2019 | Wei | G06F 21/563 |
| 2019/0354855 A1* | 11/2019 | Kim | G06N 3/08 |
| 2020/0151254 A1* | 5/2020 | Wohlwend | H04L 51/02 |
| 2020/0293878 A1* | 9/2020 | Bhaskar | G06F 16/35 |
| 2021/0125091 A1* | 4/2021 | Fang | G06N 3/084 |

OTHER PUBLICATIONS

Salmon Run: Visualizing Intermediate Outputs of a Similarity Network, pp. 1-6 (Year: 2017).*

* cited by examiner

*Primary Examiner* — Cesar B Paula
*Assistant Examiner* — Carl E Barnes, Jr.

(57) ABSTRACT

A machine learning model, including: a categorical input feature, having a defined set of values; a plurality of non-categorical input features; a word embedding layer configured to convert the categorical input feature into an output in a word space having two dimensions; and a machine learning network configured to receive the output of the word embedding layer and the plurality of non-categorical input features and to produce a machine learning model output.

16 Claims, 2 Drawing Sheets

WORD EMBEDDING FOR NON-MUTUALLY EXCLUSIVE CATEGORICAL DATA

TECHNICAL FIELD

Various exemplary embodiments disclosed herein relate generally to word embedding for non-mutually exclusive categorical data.

BACKGROUND

Categorical data is usually a set of finite, known a priori, mutually exclusive elements. A typical example of categorical data is the patient's type of admission, which may be inpatient, outpatient, emergency, medical, surgical, trauma etc. Another example is a categorical code defining a patient's diagnosis. This information may be very important in predicting outcomes. Another feature of this dataset is that some feature values may be similar to each other. For example, in the type of admission, the emergency and trauma types are more similar than the other values. To be effectively used in machine learning models, these feature values need to be transformed into binary or numerical features.

The two most common techniques to transform this data are as follows. The first is hot encoding. This takes each distinct feature value and makes it into a column with binary values indicating if the feature value is present or absent in the particular example. In the above example, this would mean converting the type of admission into inpatient/outpatient/ . . . etc., and for each admission one (or more) of these columns have a 'TRUE' value and the others are 'FALSE'.

The second is to convert this data to numerical values. This converts each distinct feature value into ordinal numbers. So, in the above example one way of converting the dataset would be: Inpatient=1, Outpatient=2, Medical=3 etc.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a machine learning model, including: a categorical input feature, having a defined set of values; a plurality of non-categorical input features; a word embedding layer configured to convert the categorical input feature into an output in a word space having two dimensions; and a machine learning network configured to receive the output of the word embedding layer and the plurality of non-categorical input features and to produce a machine learning model output.

Various embodiments are described, wherein the categorical input feature is one-hot encoded.

Various embodiments are described, wherein the categorical input features are encoded using a plurality of integers.

Various embodiments are described, wherein the word embedding layer includes coefficients that are determined by training the machine learning model.

Various embodiments are described, wherein converting the categorical input feature into an output in a word space having two dimensions further includes: calculating $K_i = W_i * X_i$, where $K_i$ is the output of the word embedding, $W_i$ is the word embedding matrix, and $X_i$ is the categorical input value.

Various embodiments are described, wherein the categorical input feature is one-hot encoded, and $$K_i = \begin{bmatrix} W_{1h} \\ W_{2h} \\ \ldots \\ W_{kh} \end{bmatrix}$$

where h is the position in the one-hot encoded input where the value 1 is located.

Various embodiments are described, further including: a graphical user interface configured to display a heatmap plot of the each of the resulting word embedding outputs for each of the values of the categorical input.

Various embodiments are described, wherein the graphical user interface displays lines connecting similar categories of the categorical input.

Further various embodiments relate to a method of producing an output of a machine learning model, including: receiving a categorical input feature, having a defined set of values; receiving a plurality of non-categorical input features; converting, by a word embedding layer, the categorical input feature into an output in a word space having two dimensions; and receiving, by a machine learning network, the output of the word embedding layer and the plurality of non-categorical input features; and producing a machine learning model output of a machine learning model output.

Various embodiments are described, wherein the categorical input feature is one-hot encoded.

Various embodiments are described, the categorical input features are encoded using a plurality of integers.

Various embodiments are described, wherein the word embedding layer includes coefficients that are determined by training the machine learning model.

Various embodiments are described, converting the categorical input feature into an output in a word space having two dimensions further includes: calculating $K_i = W_i * X_i$, where $K_i$ is the output of the word embedding, $W_i$ is the word embedding matrix, and $X_i$ is the categorical input value.

Various embodiments are described, wherein the categorical input feature is one-hot encoded, and $$K_i = \begin{bmatrix} W_{1h} \\ W_{2h} \\ \ldots \\ W_{kh} \end{bmatrix}$$

where h is the position in the one-hot encoded input where the value 1 is located.

Various embodiments are described, further including: displaying on a graphical user interface a heatmap plot of the each of the resulting word embedding outputs for each of the values of the categorical input.

Various embodiments are described, wherein the graphical user interface displays lines connecting similar categories of the categorical input.

Further various embodiments relate to a method of training a machine learning model including a word embedding layer, including: receiving training data including a categorical input feature, having a defined set of values and a plurality of non-categorical input features; inputting the received training data into the machine learning model, wherein the machine learning model includes the steps of: converting, by a word embedding layer, the categorical input feature into an output in a word space having two dimensions; receiving, by a machine learning network, the output of the word embedding layer and the plurality of non-categorical input features; and producing a machine learning model output of a machine learning model output, and calculating an error metric; and adjusting parameters of the machine learning model based upon the error metric.

Various embodiments are described, wherein the categorical input feature is one-hot encoded.

Various embodiments are described, wherein the categorical input features are encoded using a plurality of integers.

Various embodiments are described, wherein the word embedding layer includes coefficients that are parameters determined by training the machine learning model.

Various embodiments are described, wherein converting the categorical input feature into an output in a word space having two dimensions further includes: calculating $Ki=Wi*Xi$, where $Ki$ is the output of the word embedding, $Wi$ is the word embedding matrix, and $Xi$ is the categorical input value.

Various embodiments are described, wherein the categorical input feature is one-hot encoded, and $$K_i = \begin{bmatrix} W_{1h} \\ W_{2h} \\ \ldots \\ W_{kh} \end{bmatrix}$$

where h is the position in the one-hot encoded input where the value 1 is located.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
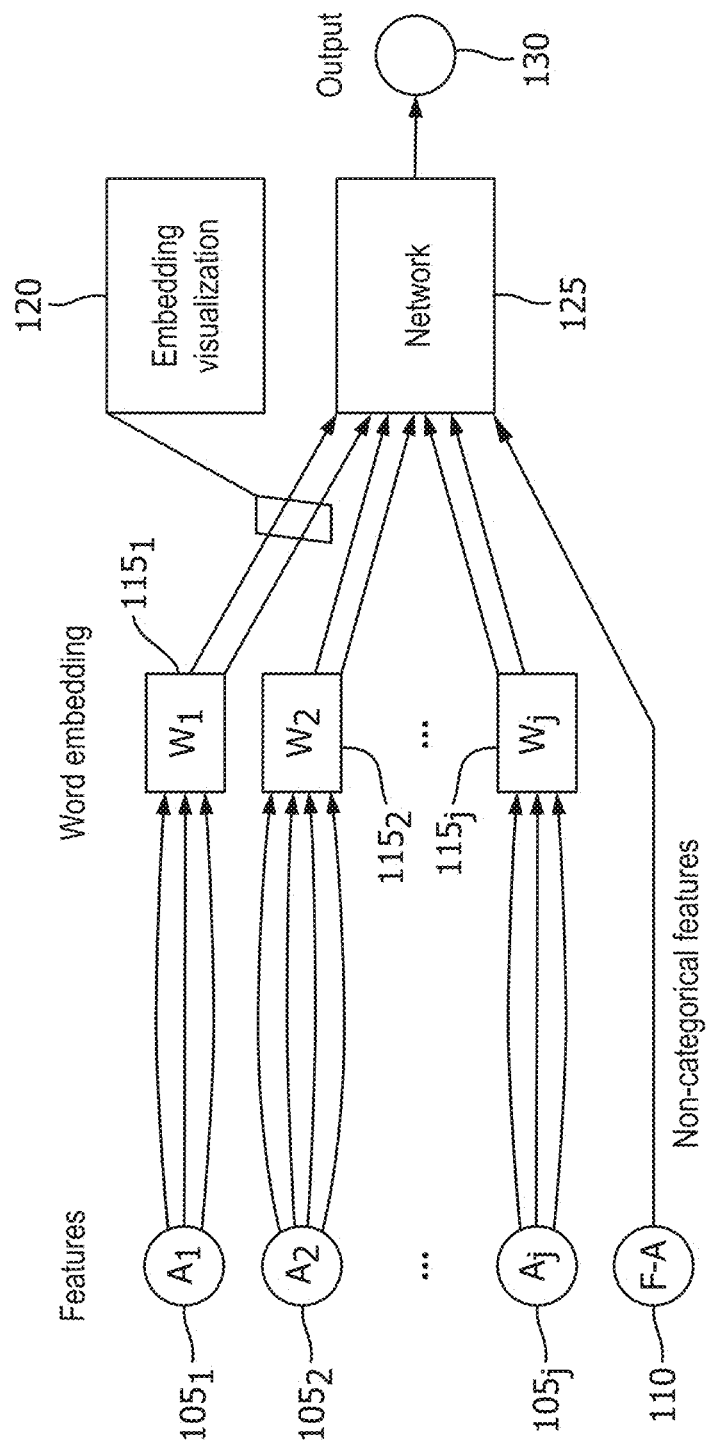
FIG. 1 illustrates an example schematic of machine learning model architecture with the embedding layer.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Both of the techniques described above have drawbacks. One-hot encoding transforms a single feature into multiple features corresponding to the number of distinct values the original feature could have. This could potentially increase the size of the input dataset and create a sparse dataset with a large number of columns, but little actual meaningful data. To reduce dimensionality after one-hot-encoding of categorical features, values with low prevalence are often simply removed, e.g., through implementation of a prevalence threshold. However, this removes information, and, depending on the prediction task, a low prevalence feature value can still have a high predictive power.

Converting categorical values into numerical values does change the dimensions of the input dataset, but it falsely creates order and association between values where none exist. In the above example, an algorithm may interpret 'Inpatient' and 'Outpatient' to be closer together since they are sequential, where no such association is appropriate.

Neither of these methods provides any insight into the correlation between these features. Depending on the prediction task, some of these features are more important than others or some features are more likely to occur together. To capture these relationships, these features may be hand-coded. However, this may become infeasible when there are a large number of possible values or feature interpretation requires expert knowledge.

Embodiments of a word embedding based solution which automatically determines the importance of features and which features are related is described herein. Word embeddings map a set of vocabulary onto another set of vocabulary, usually in a lower dimension. A word embedding can thus be seen as a representation of information contained in a vocabulary. Word embeddings are known in different applications, mainly in language processing on free text. Two-dimensional embeddings profit from being more easily interpreted, but only two dimensions is too small a dimension for many applications in speech processing. There have already been two dimensional mappings of vocabulary (e.g. Word2vec).

The embodiments described herein include a word embedding which maps a high-cardinality categorical feature in a lower dimensional space. The embedding is trainable and thus depends on the prediction task. As a result, the embedding will find correlations in the input features that may not be apparent to a human user. FIG. 1 illustrates an example schematic of machine learning model architecture with the embedding layer. The machine learning model receives a set of categorical features $105_1, 105_2, \ldots 105_j$ and a set of non-categorical features 110. Each set of categorical features is sent to its own embedding node $115_1, 115_2$, and $115_j$ in the embedding layer. The word embedded features and non-categorical features are then fed into the network 125 which produces an output 130.

The main insight is that typical medical categorical features can be fully represented in a two-dimensional continuous space (performance does not change by reducing dimension). This method uses the prediction task of interest to smartly reduce dimensionality. Higher dimensionality requires far higher amounts of training data which is not available in most medical databases.

The general structure of the pre-network word embedding is shown in the FIG. 1. Every categorical feature $A_i$ with its values $X_i \in p_i$ is mapped through an independent (i.e., independent from the other word embeddings) word embedding $W_i$ that is a $k_i \times p_i$ matrix. $p_i$ is the number of different values of the categorical feature (e.g., there were 68 different service codes in the example above, so $p_i$ would be 68). $k_i$ is the dimension chosen to represent this feature (e.g., if it were decided to map those 68 values in a 2 dimensional space, then $k_i$ would be 2). $P_i$ is thus defined by the data, while $k_i$ is a hyper-parameter. The word embedding W can be trained using back-propagation. The word embedding is therefore a linear mapping from $X_i$ to $K_i$, usually a lower dimension. The embedding may be trained with whatever label is wanted or used. The categorical feature $A_i$ is defined by its values $X_i$ as follows:

$$A_i = \{X1, X2, \ldots, Xp\} \quad (1).$$

Next the value $K_i$ is calculated as follows:

$$K_i = W_i * X_i \quad (2).$$

This may be expanded to:

$$K_i = \begin{bmatrix} w_{11} & w_{12} & \ldots & w_{1p} \\ w_{21} & w_{22} & \ldots & w_{2p} \\ \ldots & \ldots & \ldots & \ldots \\ w_{k1} & w_{k2} & \ldots & w_{kp} \end{bmatrix} * \begin{bmatrix} X_1 \\ X_2 \\ \ldots \\ X_p \end{bmatrix} = \begin{bmatrix} \sum_{j=0}^{p} W_{1j} * X_j \\ \sum_{j=0}^{p} W_{2j} * X_j \\ \ldots \\ \sum_{j=0}^{p} W_{kj} * X_j \end{bmatrix} \quad (3)$$

In the case of one-hot encoding, for every sample $s_i$, exactly one value will be 1 and all other values will be 0. Now assume that the sample $s_i$ has value h with $h \in \{1, 2, \ldots, p\}$, then, $K_i$ for sample i resolves to:

$$K_i = \begin{bmatrix} w_{11} & w_{12} & \ldots & w_{1p} \\ w_{21} & w_{22} & \ldots & w_{2p} \\ \ldots & \ldots & \ldots & \ldots \\ w_{k1} & w_{k2} & \ldots & w_{kp} \end{bmatrix} * \begin{bmatrix} s_1 \\ s_2 \\ \ldots \\ s_p \end{bmatrix} = \begin{bmatrix} \sum_{j=0}^{p} W_{1j} * s_j \\ \sum_{j=0}^{p} W_{2j} * s_j \\ \ldots \\ \sum_{j=0}^{p} W_{kj} * s_j \end{bmatrix} = \begin{bmatrix} W_{1h} \\ W_{2h} \\ \ldots \\ W_{kh} \end{bmatrix} \quad (4)$$

The rest of the model is trained with other features that are continuous and binary. In addition, the two embedding derived features per group of categorical variables are input into the model. The final model uses these features to learn the appropriate weights for each feature.

Figure 2:
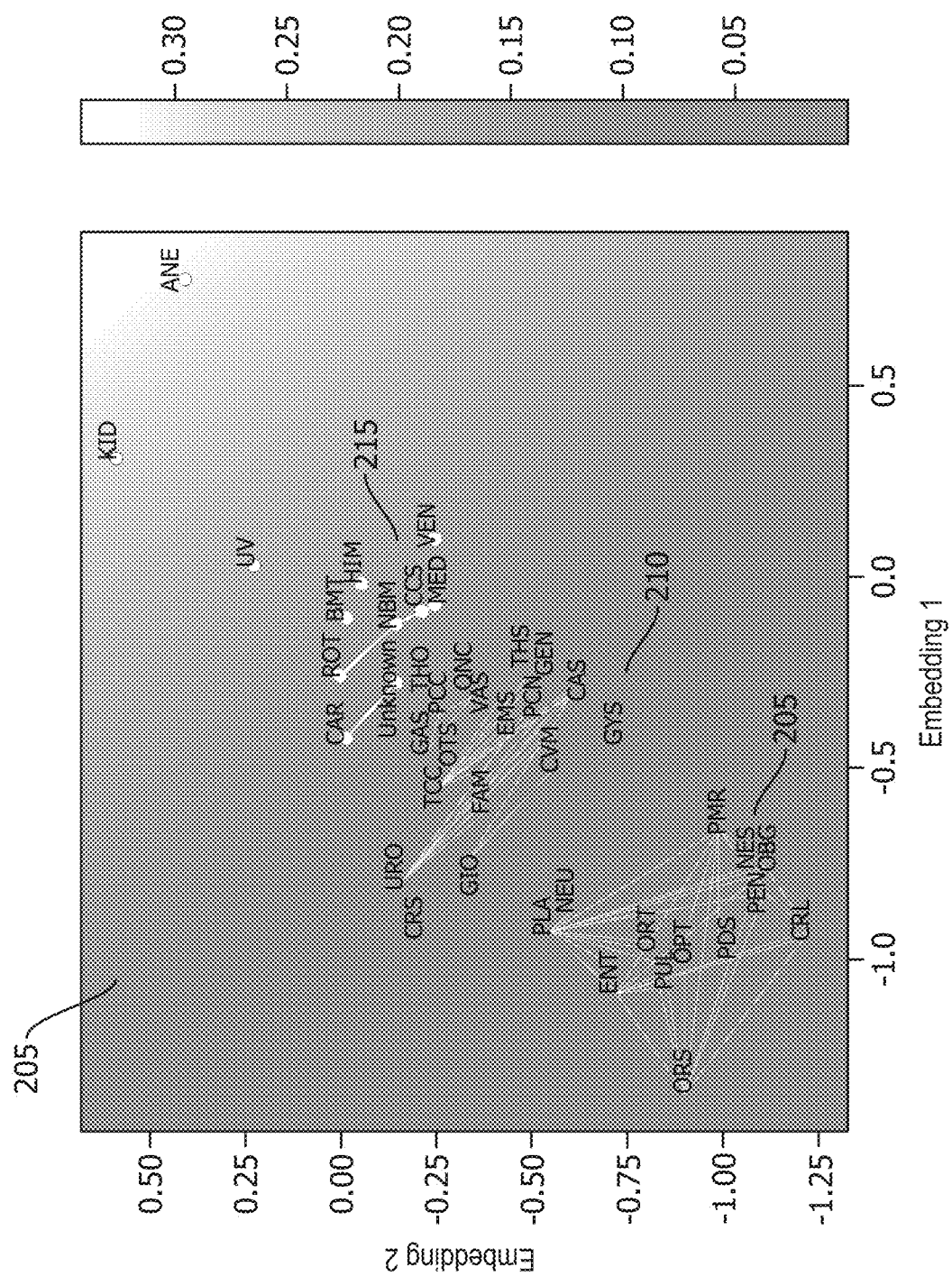
FIG. 2 illustrates an embedding visualization using a heat map.

An enhancement of this technique is to visualize the two-dimensional embedding and make it interpretable will now be described. The interpretability is essential when the results are presented for experts to review. FIG. 2 illustrates an embedding visualization using a heat map. The heatmap is determined using forward-propagation in the real network. This means, that to determine the heatmap, the word embedding layer is removed and all technically possible inputs are toggled for one word-embedding while keeping the other input fixed. This is particularly meaningful when there are few different word embeddings. The heatmap will change during training as well, so that calculation is necessary for every step in order to provide meaningful interpretation. The heatmap may help quantify the importance of one categorical feature compared to another one by analyzing the maximal possible values of the heatmap. Heatmap values go from 0 to 1, as shown by axis on the right side in FIG. 2. A value close to 0 means that the output is likely to be associated with the control class. Accordingly, a value close to 1 means that this value is likely to indicate the positive class. However, this only works in limited cases in which it is assumed that values of one categorical feature can be dependent of each other, but independent of all other input features. This assumption is typically not true and feature importance can thus only be seen as a first estimate.

To generate the heatmap, the word embedding layer is removed and all technically possible inputs are permuted for one word-embedding while keeping the other inputs fixed. The resulting values represent the importance of that specific feature value in predicting positive class. Therefore, color values closer to 1 represent the feature is most predictive of being in disease cohort and color values closer to 0 represent the feature is most predictive of being in control cohort. Feature values with the same feature importance are joined together by lines to indicate that they contribute equally in the prediction task.

In one heatmap, if two values lie on a similar level, reducing dimensionality by merging those values into one has no impact on the prediction result. In comparison to hand-engineered features, this is less time consuming and the user bias is much smaller. In FIG. 2, features which lie on a similar level (i.e., those indicated by similar color) are connected with lines. In this example this is done by setting a distance threshold to 0.01. Those lines can be understood as a clustering of those values regarding the prediction label. The clustering can be validated by experts and then implemented. Insights may be obtained from the heatmap by experts. For example, in the case of acute kidney assessment, the KID code should be important, which is indeed the case in FIG. 2. If on the other hand, KID was at the lower left hand corner, then that would indicate that there may be a problem with training of the system. In this case three clusters may be identified 205, 210, and 215.

Below is an example output of the clustering for a feature called 'Service Code' which indicates which service the patient was admitted to. The clusters are connected in FIG. 2 by lines.

26 categorical values are clustered in 12 groups.

Cluster 0: ['CARDIOVASCULAR', 'BONE MARROW TRANSPLANT', 'GYNECOLOGY SURGERY']
Cluster 1: ['NUERO SURGERY, 'ORTHOPEDICS']
Cluster 2: ['GENERAL SURGERY, 'TRAUMA & CRITICAL CARE', 'MED', 'CARDIOLOGY', 'CARDIOVASC. MEDICINE', 'UROLOGY']
Cluster 3: ['COLON AND RECTAL SURG.']
Cluster 4: ['OTHER', 'CRITICAL CARE SERV.']
Cluster 5: ['LIVER', 'NEUROLOGY—MED.', 'PLASTIC SURGERY', 'ONCOLOGY']
Cluster 6: ['KIDNEY', 'HEMATOLOGY']
Cluster 7: ['GASTROENTEROLOGY']
Cluster 8: ['CARDIOVASCULAR SURGERY', 'THROAT SURGERY']
Cluster 9: ['ORTHO TRUMA SERVICE']
Cluster 10: ['THORACIC']
Cluster 11: ['EAR-NOSE-THROAT']

Other cluster methods may be used as well instead of calculating the lines indicating relationships between the codes or in addition to the lines.

Note that the word embeddings described herein may also be used in various types of models, including all types of health care models as well as non-healthcare models.

The embodiments described herein including the visualization help solve the technological problem of determining the overall importance of a categorical feature for the prediction task as well as reducing the dimensionality of input features. Further, the importance of the categorical feature may be compared by analyzing the extreme values of the heatmap. This means, that the importance of all possible values of one categorical feature is estimated with a metric. This can help in deciding whether the categorical feature is an important feature.

The embodiments provide an enhancement to existing machine learning methods by adding an additional layer for processing categorical features which are commonly seen in many datasets. Interpretability is very important for medical applications, and therefore models such as decision trees, which provide a feature importance are often favored over difficult to interpret machine learning models such as most deep learning methods. The embodiments help interpret the neural network used for various tasks. Further, the embodiments apply word embeddings in low dimensions, create a graph similar to existing ones, but also introduces heatmap, which shows if two values which seem closely together are closely together. This information is later used to cluster the values in groups. Additionally, the embedding is trained (thus task-dependent), but can be loaded from one task to another (transfer learning).

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention,

What is claimed is:

1. A machine learning model, comprising:
a categorical input feature, having a defined set of values;
a plurality of non-categorical input features;
a word embedding layer configured to convert the categorical input feature into an output in a word space having two dimensions; and
a machine learning network configured to receive the output of the word embedding layer and the plurality of non-categorical input features and to produce a machine learning model output, wherein the word embedding layer comprises coefficients that are determined by training the machine learning model and wherein converting the categorical input feature into an output in a word space having two dimensions further comprises: calculating Ki=Wi*Xi, where Ki is the output of the word embedding, Wi is the word embedding matrix, and Xi is the categorical input value.

2. The machine learning model of claim 1, wherein the categorical input feature is one-hot encoded.

3. The machine learning model of claim 1, wherein the categorical input features are encoded using a plurality of integers.

4. The machine learning model of claim 1, wherein the categorical input feature is one-hot encoded, and $$K_i = \begin{bmatrix} W_{1h} \\ W_{2h} \\ ... \\ W_{kh} \end{bmatrix}$$

where h is a position in a one-hot encoded input where the value 1 is located.

5. The machine learning model of claim 1, further comprising:
a graphical user interface configured to display a heatmap plot of the each of the resulting word embedding outputs for each of the values of the categorical input.

6. The machine learning model of claim 5, wherein the graphical user interface displays lines connecting similar categories of the categorical input.

7. A method of producing an output of a machine learning model, comprising:
receiving a categorical input feature, having a defined set of values;
receiving a plurality of non-categorical input features;
converting, by a word embedding layer, the categorical input feature into an output in a word space having two dimensions; and
receiving, by a machine learning network, the output of the word embedding layer and the plurality of non-categorical input features; and
producing a machine learning model output of a machine learning model output wherein the word embedding layer comprises coefficients that are determined by training the machine learning model and wherein converting the categorical input feature into an output in a word space having two dimensions further comprises: calculating Ki=Wi*Xi, where Ki is the output of the word embedding, Wi is the word embedding matrix, and Xi is the categorical input value.

8. The method of claim 7, wherein the categorical input feature is one-hot encoded.

9. The method of claim 7, wherein the categorical input features are encoded using a plurality of integers.

10. The method of claim 7, wherein
the categorical input feature is one-hot encoded, and $$K_i = \begin{bmatrix} W_{1h} \\ W_{2h} \\ ... \\ W_{kh} \end{bmatrix}$$

where h is a position in a one-hot encoded input where the value 1 is located.

11. The method of claim 7, further comprising:
displaying on a graphical user interface a heatmap plot of the each of the resulting word embedding outputs for each of the values of the categorical input.

12. The method of claim 11, wherein the graphical user interface displays lines connecting similar categories of the categorical input.

13. A method of training a machine learning model comprising a word embedding layer, comprising:
receiving training data comprising a categorical input feature, having a defined set of values and a plurality of non-categorical input features;
inputting the received training data into the machine learning model, wherein the machine learning model includes the steps of:
converting, by a word embedding layer, the categorical input feature into an output in a word space having two dimensions;
receiving, by a machine learning network, the output of the word embedding layer and the plurality of non-categorical input features; and
producing a machine learning model output of a machine learning model output, and
calculating an error metric; and
adjusting parameters of the machine learning model based upon the error metric, wherein the word embedding layer comprises coefficients that are parameters determined by training the machine learning model and wherein converting the categorical input feature into an output in a word space having two dimensions further comprises: calculating Ki=Wi*Xi, where Ki is the output of the word embedding, Wi is the word embedding matrix, and Xi is the categorical input value.

14. The method of claim 13, wherein the categorical input feature is one-hot encoded.

15. The method of claim 13, wherein the categorical input features are encoded using a plurality of integers.

16. The method of claim 13, wherein
the categorical input feature is one-hot encoded, and $$K_i = \begin{bmatrix} W_{1h} \\ W_{2h} \\ ... \\ W_{kh} \end{bmatrix}$$

where h is a position in a one-hot encoded input where the value 1 is located.

* * * * *